United States Patent [19]

Culpepper

[11] 4,137,933
[45] Feb. 6, 1979

[54] CONTROL VALVE
[75] Inventor: Jesse L. Culpepper, Houston, Tex.
[73] Assignee: TRW Inc., Cleveland, Ohio
[21] Appl. No.: 768,040
[22] Filed: Feb. 14, 1977
[51] Int. Cl.² .................................. F16K 31/122
[52] U.S. Cl. .............................. 137/219; 251/63.5
[58] Field of Search ............. 137/219, 220, 221, 222, 137/333; 251/5, 63.5, 357

[56] References Cited
U.S. PATENT DOCUMENTS

| | | | |
|---|---|---|---|
| 1,477,722 | 12/1923 | Slattery | 137/219 |
| 2,416,787 | 3/1947 | White | 137/219 |
| 2,608,204 | 8/1952 | Dunn | 137/219 |
| 2,917,269 | 12/1959 | Welker | 251/63.5 |
| 3,746,300 | 7/1973 | Welker | 251/63.5 |

FOREIGN PATENT DOCUMENTS 1,110,348 10/1955 France .................................. 251/63.5

Primary Examiner—Martin P. Schwadron
Assistant Examiner—A. Michael Chambers
Attorney, Agent, or Firm—Alan D. Rosenthal

[57] ABSTRACT

A fluid flow control device which incorporates a ring or annulus of resilient material which may be deformed to effect a variable closure with a centrally disposed member, thereby controlling fluid flow through the device. The device is also capable of effecting a "fail-safe" metal-to-metal seal should the resilient element be damaged or a metal-to-metal seal be desired for shutting off flow through the device.

11 Claims, 9 Drawing Figures

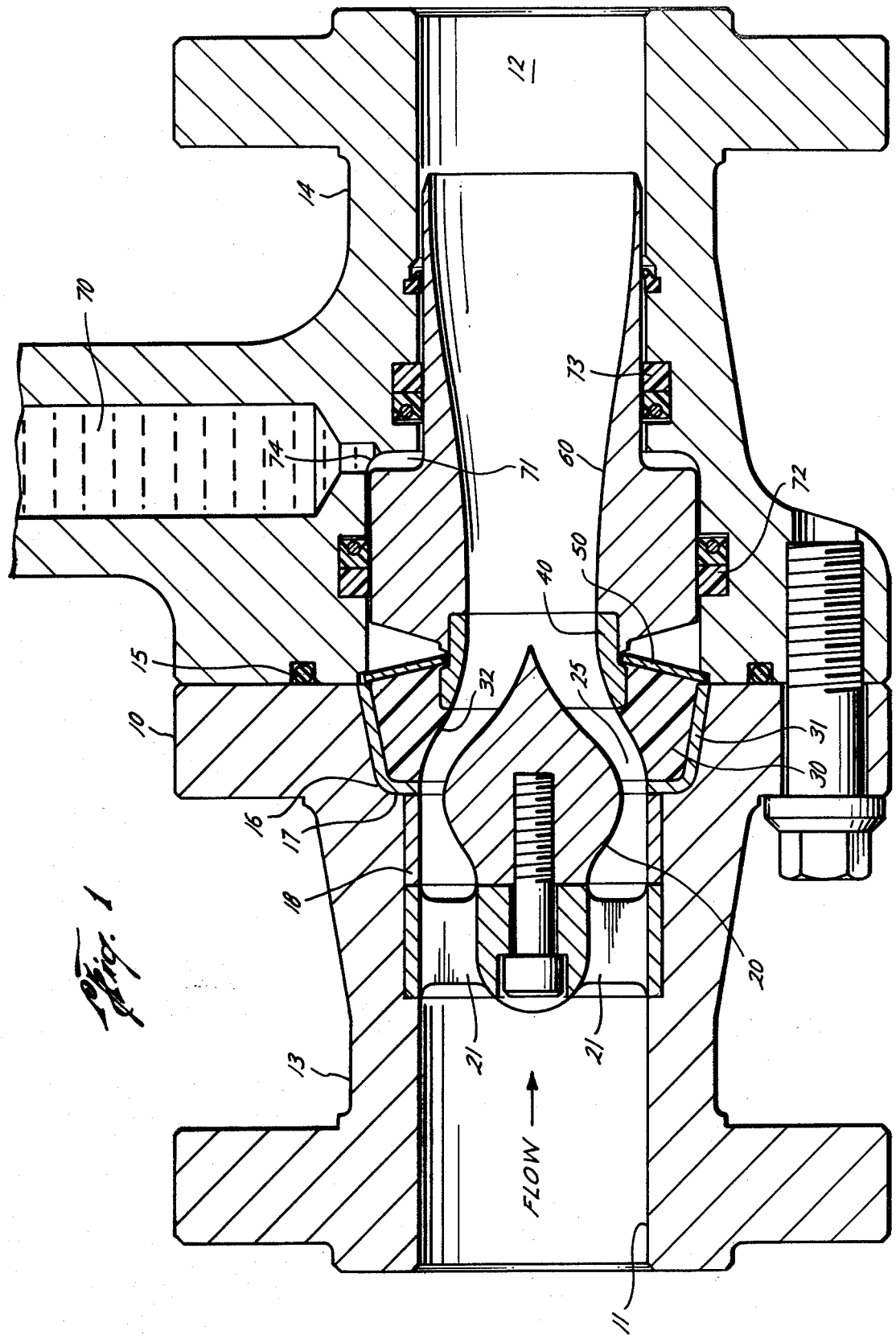

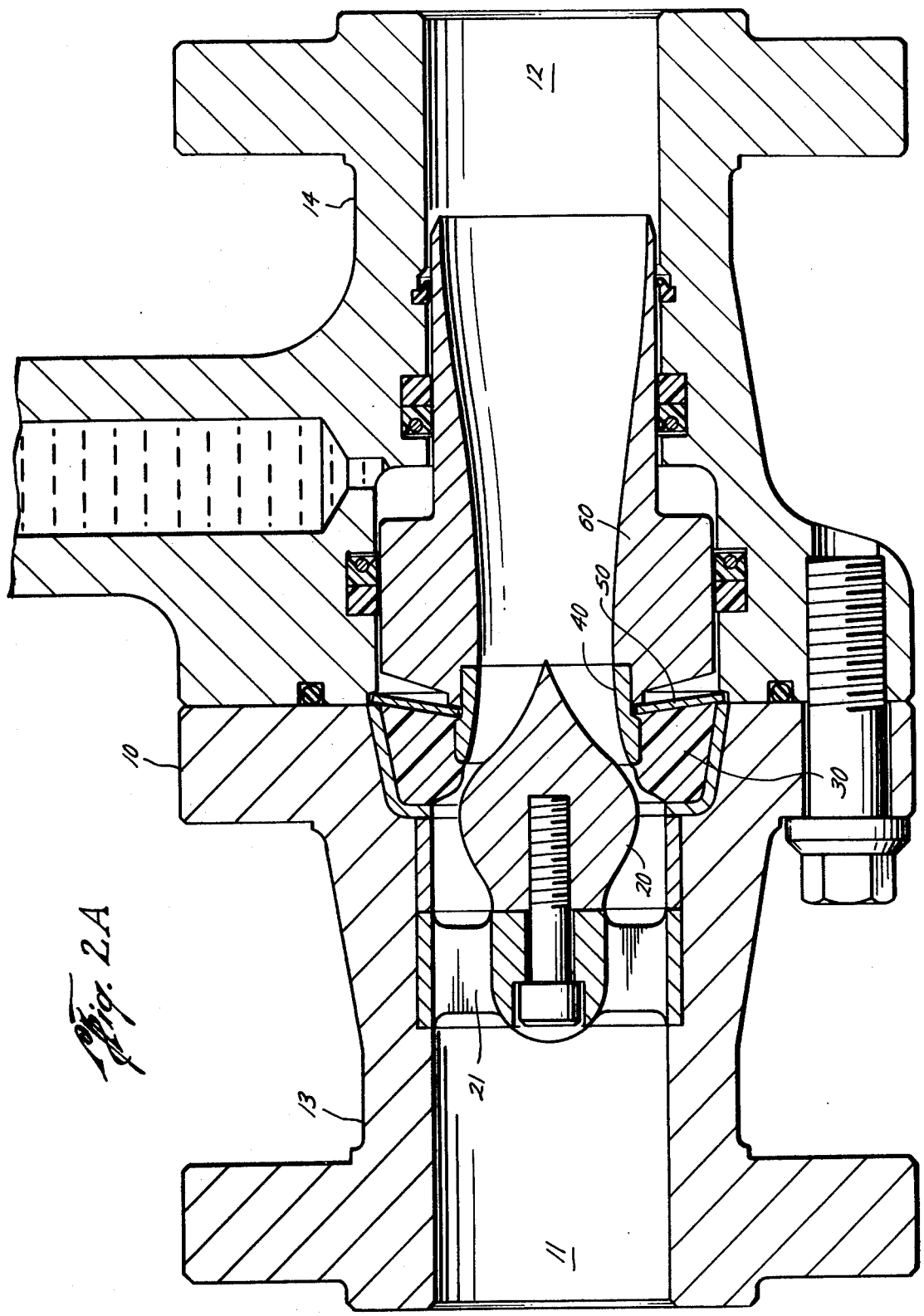

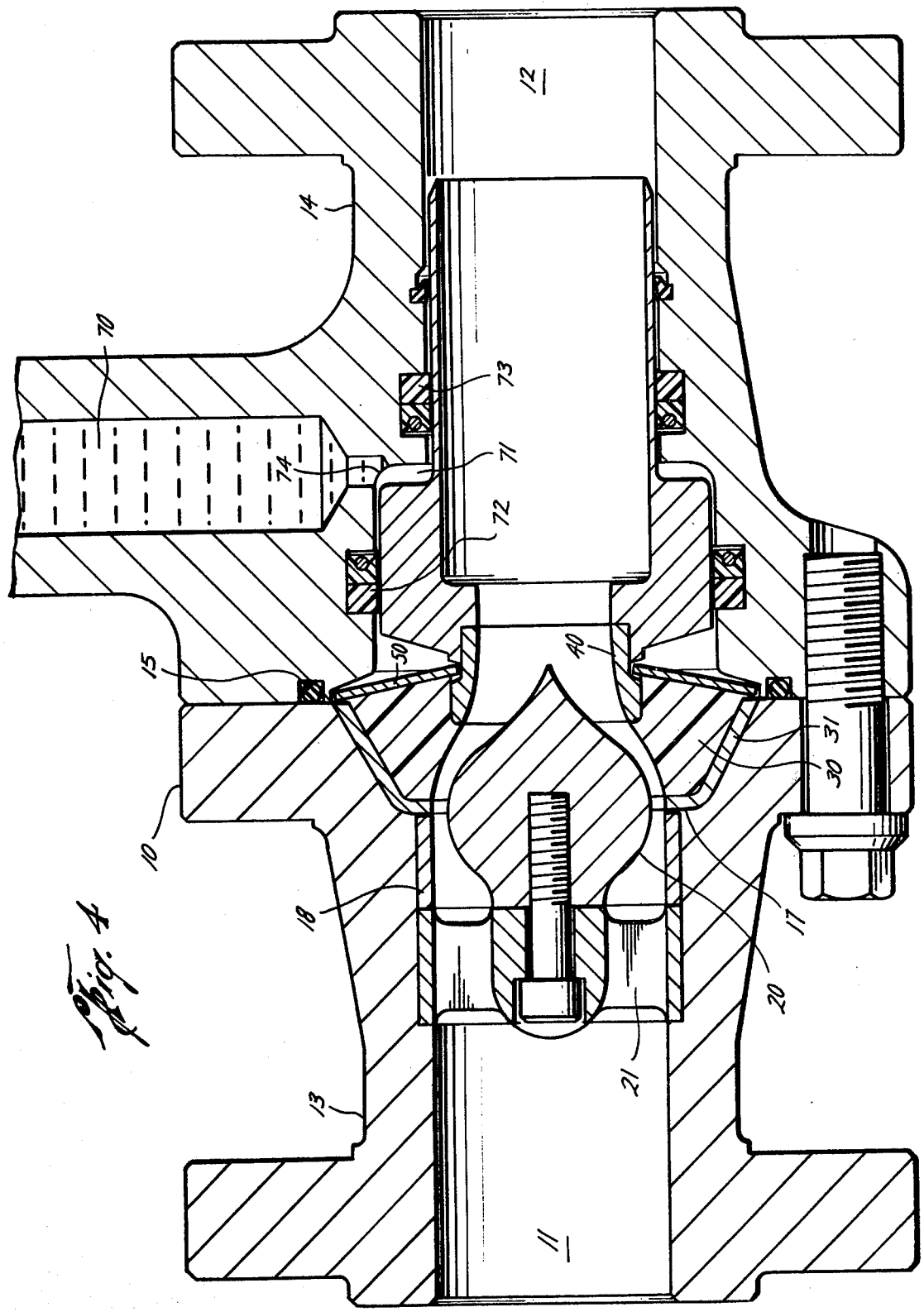

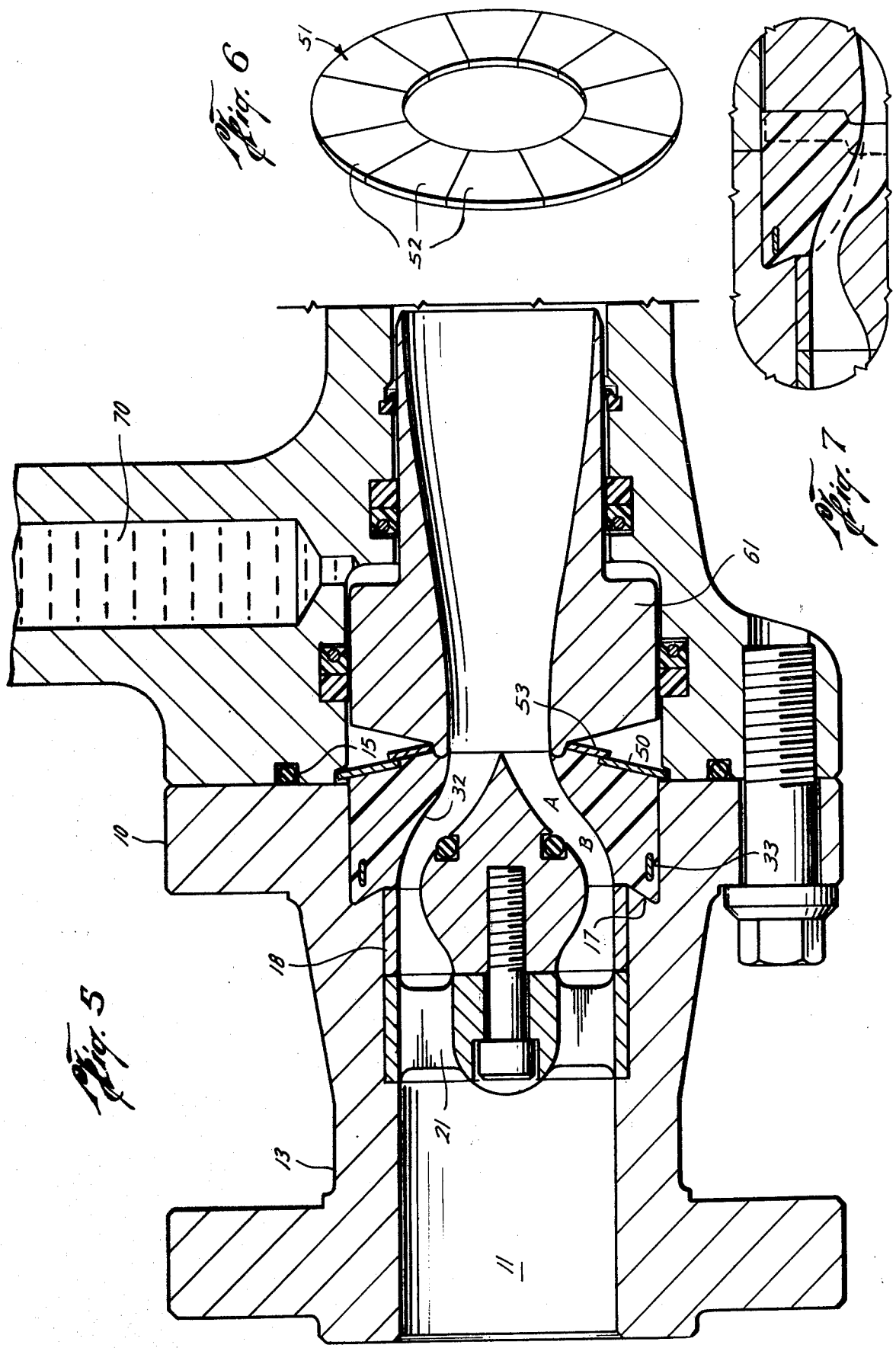

CONTROL VALVE

BACKGROUND OF THE INVENTION

This invention relates to control valves used to variably control fluid flow.

The prior art discloses a number of "hard-trim" control valves, wherein a variable closure is effected between a rigid central member and a rigid annular or cylindrical member. Typical devices are disclosed in Shaw, U.S. Pat. No. 263,731 (1882); Haley, U.S. Pat. No. 654,891 (1900); Johnson, U.S. Pat. No. 1,030,890 (1912); Slattery, U.S. Pat. No. 1,477,722 (1923); and Larner, U.S. Pat. No. 1,514,975 (1921). In these devices, closure was effected in one of two ways. In devices such as shown in Haley '891 or Slattery '722, a slideable cylindrical sleeve, in sealed engagement with the housing of the valve, served as the moveable valve element which could seat against the stationary central member. In devices such as Shaw '731, Johnson '890, or Larner '975, the central member, or a portion of it, was slideable such that it could effect a variable closure with, or seat against, a circular seat which was attached to, or part of, the valve housing.

While these "hard trim" designs were capable of metal-to-metal closure, there were drawbacks to this type of design. As the valve element approached the seat element, and the distances between the two elements became small, instability due to the lower pressures caused by the rapidly moving fluid flowing through the small passageway resulted in slamming and bounce-back of the valve.

There disadvantages were recognized, and attempts were made to use a deformable resilient member to effect variable closure in the valve. Welker, U.S. Pat. No. 2,917,269 (1959), discloses a control valve in which the deformation of a centrally disposed plug of resilient material is used to effect a variable closure. However, the design of Welker '269 proved to be unsatisfactory because the resilient plug was easily damaged by the destructive shearing stresses established by the compression of the resilient plug, the flow through the passageway, and the pressure differential across the valve. These shearing stresses tended to cause cutting or fatigue of the resilient plug, and would cause the resilient plug to separate from the backing members or abutment spiders. This damage to the plug could result in valve failure or poor valve performance.

Sachnik, U.S. Pat. No. 3,368,787 (1968); Culpepper, U.S. Pat. No. 3,380,470 (1968); and Welker, U.S. Pat. No. 3,746,300 (1973), all recognized these problems, and attempted, through various artifices, to extend the life of the resilient plug. None of these designs contemplated a means whereby the valve could be closed with a metal-to-metal seal, either in the event of plug damage or otherwise.

Boynton, U.S. Pat. No. 2,429,546 (1943), and Griffin, U.S. Pat. No. 3,342,215 (1967), contemplated the use of a cylindrical plug of resilient material with a passage through it to control fluid flow. By placing the plug in axial compression, the size of the passageway could be varied. However, in both of these designs, the plug was relatively long compared with its diameter. Furthermore, in Griffin '215, the slip/stick frictional forces associated with the operation of a valve of that design could cause valve "hunting" and overshoot. Neither design was capable of effecting a metal-to-metal seal, and neither design utilized a rigid seat member.

Accordingly, an object of the present invention is to provide a control valve which reduces or eliminates the slamming and bounce-back and consequent valve chatter associated with the "hard trim" type control valves.

Another object of the invention is to provide a control valve utilizing a resilient valve closure element in which the resilient element is less subject to cutting and fatigue and consequent failure.

Another object of the invention is to provide a control valve whose operating characteristic may be altered by relatively simple design changes.

Yet a further object of this invention is to provide a control valve which uses a resilient valve closure element having a wide seal area capable of sealing over entrapped foreign particles and yet which is also capable of a metal-to-metal type seal.

Other objects and purposes of this invention will appear from the following descriptions, examples, and claims.

BRIEF DESCRIPTION OF THE DRAWINGS

FIG. 1 is a longitudinal section of the novel control valve.

FIGS. 2a, 2b, and 2c are longitudinal sections of the control valve illustrating its operation.

FIGS. 3, 4, and 5 are longitudinal sections of alternative embodiments of the control valve illustrating additional features.

FIG. 6 illustrates the petal-leaflet type washer.

FIG. 7 is a detail of a longitudinal section of a control valve not incorporating the belleville washer.

SUMMARY OF THE INVENTION

Figure 2B:
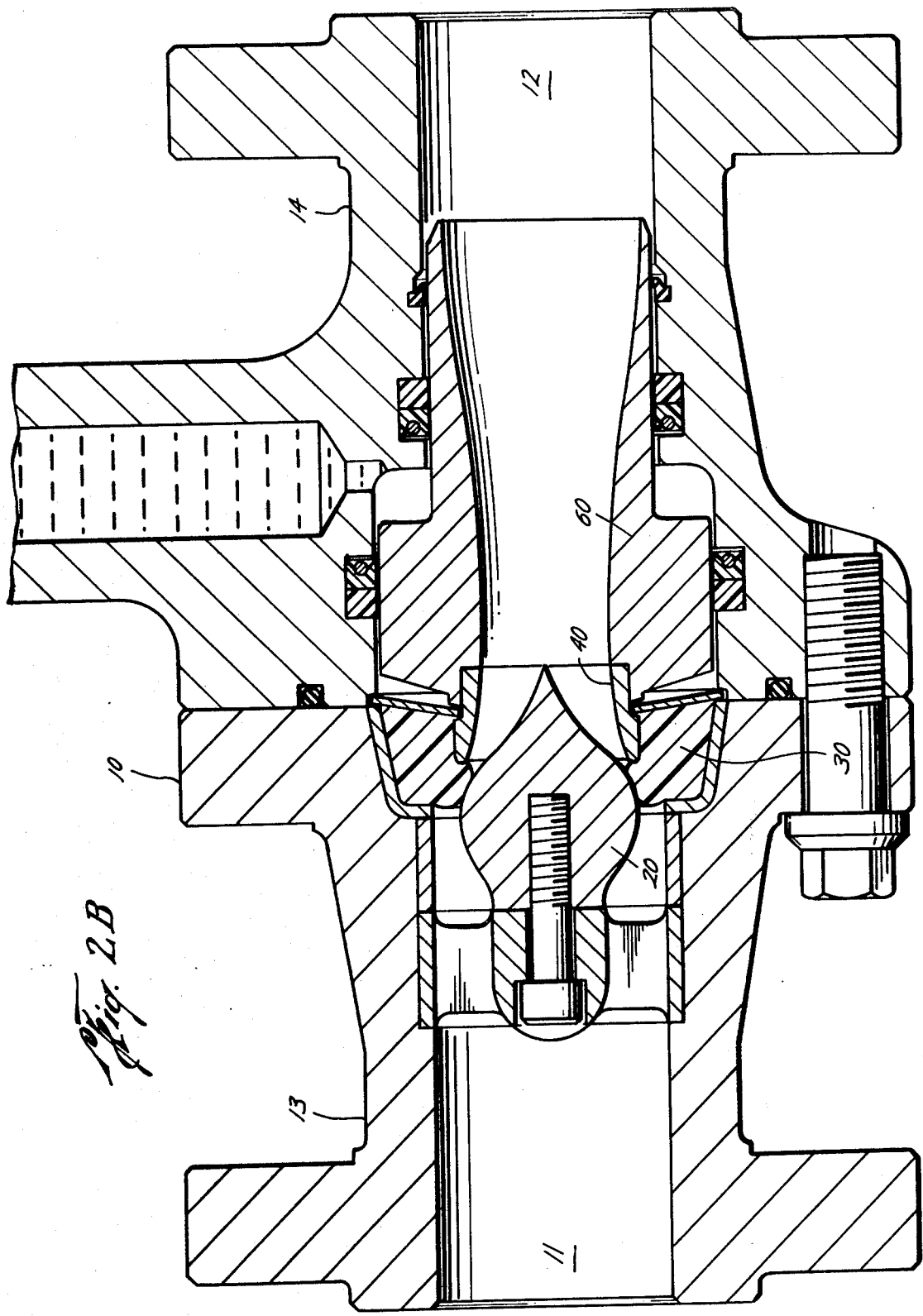

The novel control valve has an annular passageway defined by a stationary central member and an encircling annular or ring-shaped resilient element. Deformation of the resilient element by placing the element in axial compression causes the resilient element to deform radially inward, thus constricting the annular passageway. The central member and other elements may be streamlined to reduce turbulence; and the various parts of the valve may be designed to form a variable throat, converging-diverging nozzle, thereby further reducing turbulence and providing for a more efficient control valve. The resilient element may be compressed by an annular piston operated by a control fluid pressure source or by other means, such as mechanically or electro-mechanically. The use of a belleville washer interposed between the resilient element and the annular piston will reduce slip/stick frictional forces between the resilient element and the piston, thereby providing smooth operation of the control valve and reducing valve "hunting" and overcorrection.

DESCRIPTION OF THE PREFERRED EMBODIMENTS

The basic elements of the novel control valve are illustrated in FIG. 1. The control valve generally includes a tubular body or casing 10, a stationary central member 20, a resilient element 30, a sealing or choke element 40, a belleville washer 50, an annular piston 60, and a source of pressurized fluid 70 to operate the piston 60.

The body 10 has a fluid flow conduit therethrough, with an inlet 11 and an outlet 12. Flanges or other suitable means may be provided at each end of the body 10 for attaching the control valve to a pipeline or other conduit. For ease of manufacture and assembly, the body 10, may be made of two sections 13 and 14 with an O-ring 15 between them for sealing.

The stationary central member 20 is centrally disposed and attached to the body 10 by radial vanes 21, which form a support spider. The central member 20 is streamlined to reduce turbulence in the flow stream. The vanes 21 are also streamlined to reduce turbulence. The shape of the central member 20 in part determines the flow characteristic of the control valve, as is discussed later.

The resilient element 30 is approximately ring-shaped. The resilient element may be bonded to a liner 31 which fits against the body surface 16, lip 17, and annular spacer 18, as shown in FIG. 1. Alternatively it may be shaped to fit against the body surface 16 and lip 17, and be bonded thereto, as shown in FIG. 5, or the element may be held in place by fluid pressure. The resilient element 30 may be made of any appropriate resilient material, depending upon the fluid to be controlled and the desired characteristics of the control valve. Possible choices for material would include polyurethane. A reinforcing ring 33, as shown in FIG. 5, or any other reinforcing fibers or materials may be included in the resilient element 30. The resilient element may be bonded by any appropriate conventional bonding technique. As discussed later, the shape of the resilient element surface 32 and the width and thickness of the resilient element 30 will affect the flow characteristic of the control valve.

The annular choke element 40 is positioned between the resilient element 30 and the piston 60 as shown. The choke element 40 may be made of metal, plastic, or some composite material, and should be more rigid than the resilient element 30. The choke element 40 may be bonded to the resilient element 30. When the resilient element is bonded to liner 31 and choke element 40, it becomes an easily assembled or replaced unit. Alternatively, the choke element 40 and the annular piston 60 may be made a single element 61 as shown in FIG. 5.

The belleville washer 50 serves to transmit the compressive force of the piston 60 to the resilient element 30. While it would be possible to design the piston 60 to have a surface which would abut the resilient element 30 and directly compress it, such a design would not operate smoothly because of increased frictional forces and other stresses. As shown in FIG. 1, the outer circumference of the belleville washer 50 is confined by a groove in the body. The piston 60 operates on the inner edge of the belleville washer 50 to actuate the resilient element 30. Thus, the outer perimeter of the resilient element 30 does not move or slip against the inner surface of the liner 31 or the body (if no liner is used), as would occur if the belleville washer were not used (as shown in FIG. 7). The longitudinal movement of the resilient element against the inner surface of the body in a structure such as that shown in FIG. 7 could alternatively slip and stick in operation, interfering with the desired smooth operation of the control valve. Therefore, the belleville washer 50 aids in the smooth operation of this novel design.

The piston 60 is slideable within the body 10. A variable cavity 71 is formed between the piston and the body, and sealed by packings or back-up rings 72 and 73. The cavity 71 communicates with the control pressure fluid supply 70 through the port 74. The fluid pressure in the cavity controls the movement of the piston 60.

Figure 2C:
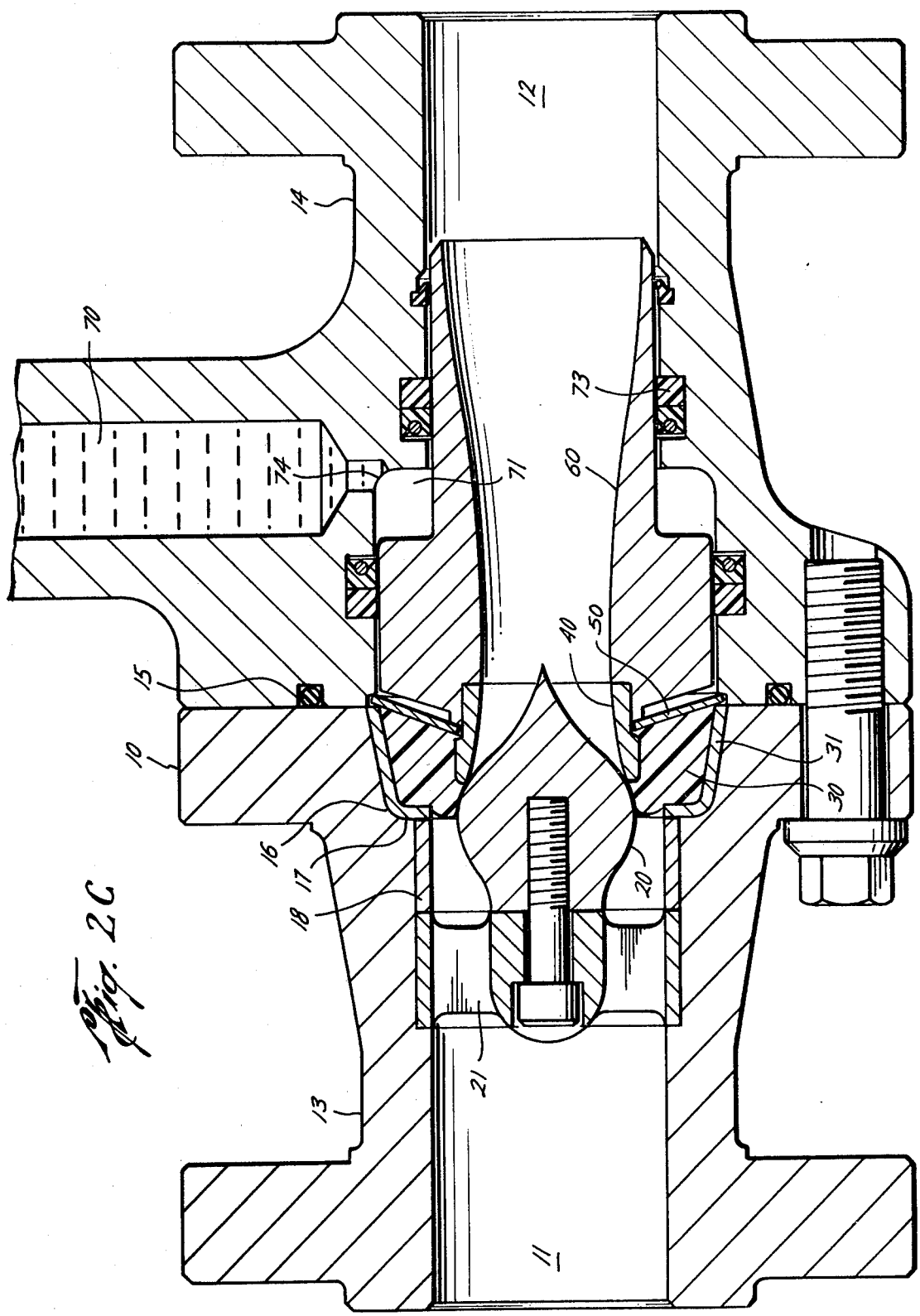

Operation of the control valve is as follows. As the control fluid pressure increases, the piston 60 is urged against the belleville washer 50, which compresses the resilient element 30. Constrained against expansion by the liner 31 and the washer 50, the resilient element 30 deforms by bulging inward toward the stationary member 20, thereby varying the size of flow passages 25 between the resilient element 30 and the stationary member 20 to control the flow through the control valve. See FIG. 2a. A decrease in the control fluid pressure will decrease the compressive force being applied to the resilient element 30 and washer 50 which will tend to resume their unstressed shapes and thereby increase the size of the flow passage 25. When the washer 50 is bonded to the resilient element 30, the spring action of the washer 50 will tend to force the resilient element 30 back to its previous shape. This can be a definite advantage in cold environments in which the elastomer may become less resilient or when the elastomer ordinarily has a bad compression set. Sufficient pressure of the control fluid will cause the resilient element 30 to bulge inward to such a degree as to contact the central member 20 and effect a seal. See FIG. 2b. If foreign particles are entrained in the fluid whose flow is being controlled, the large sealing area offered by the resilient element will allow closing off around these particles for a "bubble-tight" seal. Additional control fluid pressure will cause the choke element 40 to contact the central member 20, thereby effecting a metal-to-metal seal for closing off flow. See FIG. 2c. This is a tremendous advantage over previous designs for control valves which utilized a resilient valve element. Very high pressure drops across the control valve can be maintained without incurring damaging extrusion of the resilient element 30 because, with the choke element 40 in its sealing position, no gap for extrusion exists. It is also inherent in this novel design that as the bulge in the resilient element 30 increases to restrict the fluid flow through the flow passage 25, the distance between the choke element 40 and the central member 20 decreases, thereby reducing the extrusion gap. Furthermore, should the resilient element 30 deteriorate or become damaged by erosion or whatever, the control valve still has the metal-to-metal shut off capability, and, in fact, can continue to perform a flow control function. In previous designs, damage to the resilient element would impair or eliminate shut off capability.

Figure 3:
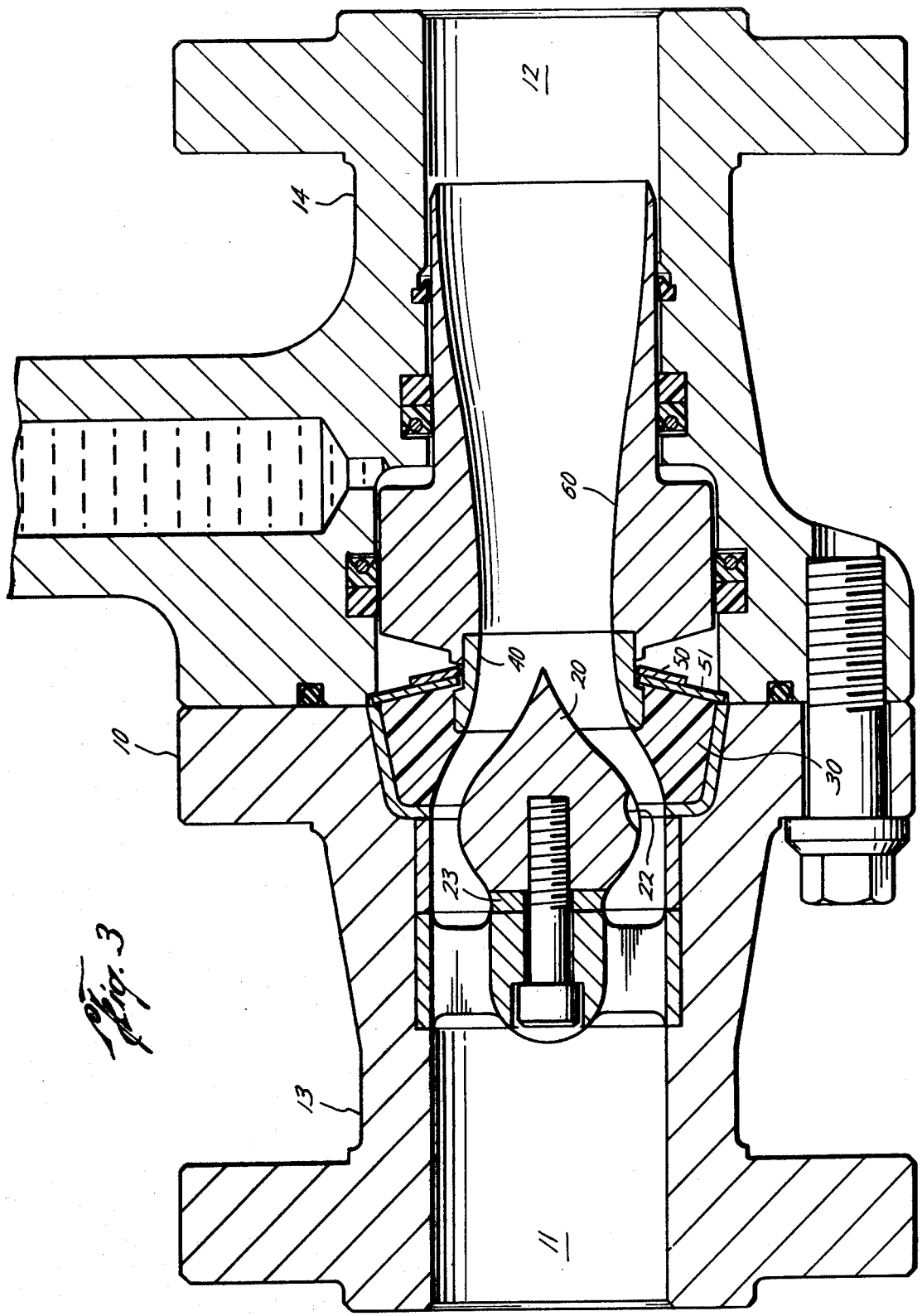

As the bulge in the resilient element 30 closely approaches the central member 20, and the annular flow passage 25 becomes small, some section of the flow passage will offer a path of least resistance. Accordingly, the resilient element 30 will come into partial contact with the central member 20, and a crescent-shaped rather than annular flow passage will result. In order to predetermine the location of the formation of the crescent-shaped flow passage and to stabilize the location of the flow passage, a small discontinuity or indentation 22 can be made in the surface of the central member 20 in the vicinity of that portion of the central member first contacted by the resilient element 30 as shown in FIG. 3. The use of one or more of these discontinuities will insure development of the flow passage at a predetermined spot or spots as chosen. Alternatively, the central member 20 may be mounted slightly off-center or be eccentric in cross-section to insure proper formation of the crescent-shaped orifice.

The belleville washer 50 may be replaced by a petal-leaflet type washer 51 illustrated in FIG. 6, in which multiple petal-leaflet segments 52 form an annular ring. Alternatively, the single belleville washer 50 may be replaced by multiple belleville washers, as shown in FIG. 5, or a combination of a petal leaflet washer 51 and belleville washer 50, as shown in FIG. 3. This will affect the shape of the bulge of the resilient element 30 and the flow characteristic of the control valve.

The flow characteristic of the control valve may be altered in a number of ways. Varying the geometry of the belleville washer 50 will alter the flow characteristic of the control valve. Increasing the thickness of the resilient element 30 and, correspondingly, the outer diameter of the belleville washer 50, as shown in FIG. 4, will provide greater elastomer volume displacement for a given stroke length of the piston 60. The greater the increase in outer diameter, the greater the elastomer displacement, and the bigger the bulge for a given piston stroke length.

The flow characteristic may also be altered by changing the shape of the central member 20. Although the central member 20 is illustrated in the diagrams as symmetrical about its longitudinal axis, it need not be so. As mentioned earlier, discontinuities in the surface of the central member 20 will also serve to vary the flow characteristic. Depending upon the size, shape, number, and locations of such discontinuities, practically any flow characteristic can be achieved.

The "shape" of the bulge in the resilient element 30 can also be varied. The initial, unstressed shape of the element 30 would ordinarily be such as to minimize turbulence in the flow passage 25. However, as the resilient element 30 is compressed and begins to bulge, the shape of the surface 32 changes. If the bulge which is formed is too abrupt or steep, the streamlined shape of the flow passage 25 is adversely affected. The resulting additional turbulence caused by the abrupt bulge will reduce the pressure recovery efficiency of the control valve. Even in previous designs, it was generally true that control valves which exhibit high recovery efficiency in the full-open position lose at least some of their recovery efficiency at decreased openings. This problem can be alleviated in the present design by controlling the shape of the bulge through the use of multiple washers 50 and 53. Referring to FIG. 5, as the piston 60 moves toward the resilient element 30, the belleville washer 53 will assume a flatter shape, thereby allowing the surface 32 of the resilient element 30 in the vicinity of A in FIG. 5 to recede while the surface 32 in the vicinity of B begins to bulge. By varying the inner diameter of the belleville washer 50, the outer diameter of the belleville washer 53, and their relative thicknesses and strengths, the shape of the resilient element surface 32 can be made to take a desired shape to maintain a flow divergence which will not reduce the pressure recovery efficiency of the valve. Also, in a flashing liquid or in cavitating service, this design will show a tendency for the bubbles to collapse in mid-stream away from the flow passage walls, thereby preventing possible damage to the control valve.

The capacity of the control valve can be varied easily in either of two ways. The maximum flow through the control valve may be reduced by the addition of a spacer or spacers of appropriate thickness, shown as 23 in FIG. 3, thereby moving the central member 20 toward the resilient element surface 32. This has the result of reducing the cross sectional area of the flow passage 25, thereby reducing the maximum flow capacity. Alternatively, the central member 20 may be replaced by a central member having a larger maximum diameter, as shown in FIG. 4, thereby reducing the cross-sectional area of the flow passage 25 and, correspondingly, the maximum flow. There is a difference between the two methods. The first method, adding a spacer, reduces the distance necessary for the piston 60 to travel to shut off flow completely, thereby reducing the amount of work necessary to effect complete shut off and also changing the flow characteristic. However, the second method, increasing the diameter of the central member 20, can be done such that there is no change in either the work necessary to effect complete shut off or the flow characteristic.

Overall, the surfaces of the central member 20, resilient element 30, choke insert 40, and piston 60 are shaped to form a converging-diverging nozzle. The advantages of such a streamlined flow passage are mostly obvious, and include less turbulence and related energy loss, high pressure recovery efficiency, large flow volumes at relatively low pressure differentials, decreased erosion of elements by fluid and foreign particles entrained in the fluid, reduced noise and vibration, and reduced side thrust friction which can cause an increase in the "dead band". Furthermore, in this design, there are no structural members or obstructions of any kind downstream of the vena contracta to prevent near perfect venturi-type nozzle divergence. It is desirable to streamline all elements to reduce turbulence and increase valve efficiency.

Under certain flow conditions, it may be advantageous to eliminate the divergent portion of the nozzle, as shown in FIG. 4. This is to prevent compression shock waves downstream of the control valve where the piping wall is not so thick or strong as the control valve body. When the flow through the divergent section of the nozzle is supersonic, shock waves occur outside the divergent section of the nozzle, which could create noise, vibration, and structural problems in the weaker piping. Also, where the flow is supersonic in the divergent section of the nozzle, the maximum capacity of the valve is not reduced by the elimination of the divergent section of the nozzle. When the flow is such that the Mach Number at the throat of the nozzle is 1 (flow rate equals sonic velocity), the shock waves will occur in the divergent portion of the nozzle itself. Under certain flow conditions, the noise and vibration created by the shock waves could be more objectionable than the turbulence created by the elimination of the divergent section of the nozzle.

A good angle for the divergent section is about 10°. Various sources recommend an angle of divergence from 6° to 12°.

When a hydraulic liquid is used as the control fluid 70, a hydraulic "snubbing" will occur which will reduce any tendency of the valve to vibrate or chatter.

If desired, the central member 20 may be modified as shown in FIG. 5 to accomodate a seat ring which the choke element will contact in forming a seal.

I claim:

1. A control valve comprising a tubular housing having a fluid flow conduit therethrough, a stationary member centrally disposed within said fluid flow conduit and supported by radially extending vanes, an annular resilient element abutting said housing and at least partially encircling said stationary member, a variable passageway between said stationary member and said resilient element, piston means slidably engaged within said housing, washer means abutting said resilient element and interposed between said resilient element and said piston means, and a control fluid pressure source for operating said piston means to cause said washer means to exert a variable compressive force on said resilient element and thereby deform said resilient element in such manner as to variably restrict said passageway.

2. The control valve of claim 1 wherein said washer is one or more belleville washers.

3. The control valve of claim 1 wherein said washer means is a ring of petal-leaflet segments.

4. The control valve of claim 1 wherein said washer means is a combination of one or more belleville washers and a ring of petal-leaflet segments.

5. A control valve comprising a housing having a fluid flow conduit therethrough, a stationary seat member centrally disposed within said conduit, an annular resilient element encircling said seat member, a variable passageway between said stationary seat member and said resilient element, an annular piston slidable within said housing, washer means abutting said resilient element and interposed between said resilient element and said piston, a rigid annular choke element which when seated against said stationary seat member forms a seal therewith, and a control fluid pressure source for operating said piston, whereby said piston exerts a variable compressive force against said washer means to deform said resilient element and thereby restrict said passageway.

6. The control valve of claim 5 wherein said stationary seat member is supported and positioned within said fluid flow conduit by radially extending vanes.

7. The control valve of claim 5 wherein said stationary seat member has one or more discontinuities in its surface to aid in controlling the deformation of the resilient element.

8. The control valve of claim 5 wherein said choke element and said piston are made in one piece.

9. The control valve of claim 6 wherein said stationary seat member and vanes are streamlined to reduce turbulence.

10. The control valve of claim 9 wherein said stationary seat member, resilient element, choke element, and piston are shaped to form a converging-diverging nozzle.

11. The control valve of claim 5 wherein said stationary seat member includes a circular seating ring.

* * * * *